United States Patent [19]

Burton

[11] 4,338,242
[45] Jul. 6, 1982

[54] URETHANE MODIFIED POLYMERS HAVING HYDROXYL GROUPS

[75] Inventor: Bruce L. Burton, Lake Jackson, Tex.

[73] Assignee: The Dow Chemical Company, Midland, Mich.

[21] Appl. No.: 188,810

[22] Filed: Sep. 19, 1980

[51] Int. Cl.³ .............................................. C08L 63/10
[52] U.S. Cl. ...................................... 523/436; 525/28; 525/454; 525/528; 525/922; 528/69; 523/466; 523/522; 523/527
[58] Field of Search .................. 528/69; 525/528, 454, 525/28; 260/37 EP

[56] References Cited

U.S. PATENT DOCUMENTS

| | | | |
|---|---|---|---|
| 2,503,209 | 4/1950 | Nyquist | 525/28 |
| 2,958,704 | 11/1960 | Dinsberg | 528/69 |
| 3,118,922 | 1/1964 | Hartung | 538/69 |
| 3,373,221 | 5/1968 | May | 525/528 |
| 3,471,449 | 10/1969 | Heydlkamp | 528/69 |
| 3,478,126 | 11/1969 | Turpin | 525/528 |
| 3,509,234 | 4/1970 | Burlant | 525/455 |
| 3,664,861 | 5/1972 | Okamura | 117/93.31 |
| 3,713,864 | 1/1973 | Ackerman | 117/38 |
| 3,776,889 | 12/1973 | Pande | 528/69 |
| 3,871,908 | 3/1975 | Spoor | 525/455 |
| 4,004,997 | 1/1977 | Tsukamoto | 528/69 |
| 4,035,523 | 7/1977 | Pampouchidis | 525/528 |
| 4,162,274 | 7/1979 | Rosenkranz | 528/69 |
| 4,221,686 | 9/1980 | Sakiyama | 525/528 |
| 4,233,426 | 11/1980 | Tefertiller | 528/69 |
| 4,239,866 | 12/1980 | Reitel | 525/455 |

*Primary Examiner*—Paul Lieberman

[57] ABSTRACT

Curable polymeric products are the reaction product of a polymer containing secondary hydroxyl groups and an aliphatic unsaturated isocyanate.

7 Claims, No Drawings

URETHANE MODIFIED POLYMERS HAVING HYDROXYL GROUPS

BACKGROUND OF THE INVENTION

In many resin applications, low viscosity and good physical properties after a minimal heat cure are necessary. Frequently, however, those objectives are antithetical. Certain polymer systems that are based on a polyglycidyl ether, such as the vinyl ester resins, have hydroxyl groups along the molecular structure. Those hydroxyl groups cause an appreciable increase in viscosity which requires extensive dilution with a monomer to permit facile fabrication.

It would be desirable to have a procedure for reducing the viscosity of hydroxyl containing polymers while at least retaining the properties of the polymer when cured.

SUMMARY OF THE INVENTION

A curable resin having improved physical and chemical properties is the reaction product of a polymer or a polymer precursor having hydroxyl groups and an unsaturated isocyanate reacted through those hydroxyls. In the uncured state, the resin has a lower viscosity than the corresponding unmodified resin. In the cured state, the increased cross-linking density provides improved heat distortion temperatures and hardness and a decrease in water and solvent sorption.

DETAILED DESCRIPTION OF THE INVENTION

The polymer or polymer precursor useful in making the reaction product must have more than one hydroxyl group in the polymer chain and is selected from the group consisting of vinyl ester resins, unsaturated polyesters, saturated polyesters and mixtures thereof.

Bowen in U.S. Pat. Nos. 3,066,112 and 3,179,623 describes the preparation of vinyl ester resins by esterifying acrylic or methacrylic acid with a polyepoxide. That patentee also describes the alternate procedure wherein a glycidyl acrylate or methacrylate is reacted with the sodium salt of bisphenols. Vinyl ester resins based upon epoxy novolacs are taught in U.S. Pat. No. 3,301,743.

For use herein, the vinyl ester resin can be prepared from any glycidyl polyether. Useful glycidyl ethers are those of polyhydric alcohols and phenols. Such glycidyl polyethers are commercially available or are readily prepared by reacting at least two moles of an epihalohydrin or glycerol dihalohydrin with one mole of the polyhydric alcohol or phenol together with a sufficient amount of caustic to react with the halogen of the halohydrin. The products are characterized by the presence of more than one glycidyl ether group per molecule.

The useful acids for making the vinyl ester resins are those ethylenically unsaturated monocarboxylic acids such as acrylic, methacrylic, cinnamic acids and their halogenated isomers. Also included are the hydroxyalkyl acrylate or methacrylate half esters of dicarboxylic acids as described in U.S. Pat. No. 3,367,992 wherein the hydroxyalkyl group preferably contains from 2 to 6 carbon atoms.

The glycidyl ether and the acid are reacted in about stoichiometric equivalency generally with heating in the presence of a catalyst, such as a trivalent chromium salt, as, for example, chromium trichloride or a tertiary amine, as, for example, tris(N,N-dimethylaminomethyl phenol). Vinyl polymerization inhibitors are also commonly included to prevent premature polymerization.

Yet another class of useful polymeric precursors are the polyesters. Unsaturated polyesters are those resulting from the polyesterification of a dicarboxylic acid such as maleic, fumaric or itaconic acid, and a polyol.

As is generally known in the polyester art, it is possible to vary the cure rate and the properties of the cured articles by including saturated aliphatic or aromatic dicarboxylic acids as a replacement for part of the unsaturated acid. Such saturated acids include adipic, succinic and phthalic acids.

The concept of the invention is also useful as a curing mechanism for saturated polyesters resulting from the polyesterification of a saturated dicarboxylic acid with a polyol.

With either saturated or unsaturated polyesters, the hydroxyls result from the use of a polyol with at least two hydroxyls per molecule. The use of a polyol, such as glycerol, would provide one secondary hydroxyl for each recurring unit, which may be more reaction sites than are needed or even desired. Thus, the glycerol can be blended with a diol, such as ethylene glycol, to moderate the density of secondary hydroxyls, to adjust the polyester properties or for other reasons. When diols are used as the polyol, an excess is used to provide hydroxyl chain termination. A combination of triol and diol results in primary and secondary hydroxyls.

It is commonplace in the vinyl ester resin and the polyester art to adjust the viscosity of the liquid uncured resin with a reactive diluent, usually a copolymerizable monomer. Suitable monomers for this use include vinyl aromatic monomers, such as styrene and vinyltoluene, and acrylate or methacrylate esters of lower alkanols. The reactive diluent may be an amount of up to 60 weight percent of the combined resin/monomer weight.

The isocyanate should preferably be aliphatic to achieve the optimum benefits of the invention. Typical of those isocyanates are those of saturated or unsaturated esters of acrylic or methacrylic acid, allyl ether isocyanate, vinyl isocyanate, unsaturated or saturated aliphatic isocyanates and blends or mixtures of any of those isocyanates.

If the polymer or precursor is saturated, the isocyanate must contain vinyl unsaturation to attain a cure. If the polymer or precursor is unsaturated, the isocyanate may be saturated, unsaturated or a combination thereof.

The isocyanate is employed in an amount of 0.05 to 1.00 equivalent per equivalent of hydroxyl. Less than about 0.05 equivalent imparts little observable change in the cured product. Any isocyanate in excess of 1.0 equivalent has no place to react and thus could detract from the desired properties of the cured product.

The reaction of the isocyanate with the secondary hydroxyl is conducted using known techniques. In a typical reaction, the polymer or polymer precursor, the reactive diluent and a catalyst, such as stannous octoate, are thoroughly mixed together and brought to a mildly elevated temperature of, for example, 50° C. The isocyanate is slowly added with stirring. Heating is maintained until absence of the isocyanate band in the infrared spectrum is attained which indicates the reaction to be complete.

The potential for cross-linking in the isocyanato product can be adjusted in several ways. The amount of unsaturation in the polymer or precursor can be varied.

The number of hydroxyls in that starting material can vary. The amount of unsaturated isocyanate can be adjusted to that providing the desired number of crosslinks. Some of the hydroxyls can be reacted with a saturated aliphatic isocyanate.

The products have improved properties, particularly heat distortion temperature, hardness and low solvent sorption. The products find use as neat resins and in reinforced plastics. Of particular note are their use in fiberglass reinforced filament wound pipe, electrical laminates, electrical insulating varnishes and coatings, bulk and sheet molding compounds, and corrosion resistant vessels and linings for vessels.

The concept of the invention will be more apparent from the following illustrative examples wherein all parts and percentages are by weight.

EXAMPLE 1

One hundred parts of the trimethacrylate of tris(4-glycidylphenyl)methane, 25 parts of styrene and 0.1 part stannous octoate were mixed while heated to 50° C. To that mix while stirred was slowly added 47.02 parts isocyanatoethyl methacrylate (IEM) and the temperature raised to 60° C. Heating and stirring were continued until the absence of the isocyanate band in the IR spectrum at 2280 cm$^{-1}$ indicated the reaction to be complete.

To the product was added 11.75 grams styrene. The resin was cured with 1.5 parts benzoyl peroxide per 100 parts resin at a temperature schedule of 2 hours at 90° C., 4 hours at 165° C. and 16 hours at 200° C.

For comparison, the trimethacrylate with 20 percent styrene was cured in an identical manner. The samples were tested according to standard methods with the following results.

|  | Nonmodified | IEM Modified |
| --- | --- | --- |
| Viscosity* (cstks) | 11,510 | 7,565 |
| HDT °C. 264, psi | >230 | >230 |
| $T_g$ | 245 | 266 |
| Flex. Mod., psi | 9.38 × 10$^5$ | 8.03 × 10$^5$ |
| Flex. Strength, psi | 17,470 | 9,466 |
| Barcol Hardness | 41 | 53 |
| Gardner Color | 17 | 17 |

*Before cure

Other samples of the above-described resins were cured with 1.5 parts benzoyl peroxide at 2 hours at 90° C. and 4 hours at 165° C. The heat distortion temperature of the nonmodified resin was 203° C. and of the IEM modified resin was greater than 230° C. The Barcol Hardness of the former was 42 and of the latter was 50.

EXAMPLE 2

A resin was prepared according to the procedure and stoichiometry of Example 1 using the dimethacrylate of the diglycidyl ether of bisphenol A as the polymer and vinyltoluene as the reactive diluent.

The resin was cured with 1.5 parts benzoyl peroxide per 100 parts of resin for one-half hour at 150° C. The samples were tested according to standard procedures with the following results.

|  | Nonmodified | IEM Modified |
| --- | --- | --- |
| Viscosity (cstks) | >1,646 | 1,445 |
| HDT °C. 264, psi | 110 | 137 |
| Flex. Mod., psi | 4.99 × 10$^5$ | 5.29 × 10$^5$ |
| Flex. Strength, psi | 21,510 | 17,240 |
| Tensile Strength, psi | 9,100 | 6,460 |
| 24 Hr. H$_2$O Boil, % Δ wt. | 1.827 | 1.758 |
| Barcol Hardness | 45 | 49 |
| Gardner Color | >1 | 1 |

What is claimed is:

1. A curable reaction product of a vinyl ester resin having secondary hydroxyl groups and from 0.05 to 1 equivalent based on said secondary hydroxyls of isocyanatoethyl methacrylate.

2. The reaction product of claim 1 wherein said vinyl ester resin is the diester of a polyglycidyl ether with an unsaturated monocarboxylic acid.

3. The reaction product of claim 1 wherein said vinyl ester resin is the diester of a diglycidyl ether of bisphenol A and a monocarboxylic acid.

4. The reaction product of claim 1 wherein said monocarboxylic acid is methacrylic acid.

5. A curable composition of the reaction product of claim 1 mixed with up to 60 weight percent of an ethylenically unsaturated monomer.

6. The composition of claim 5 wherein said monomer is styrene.

7. The composition of claim 5 further containing glass fibers.

* * * * *